J. R. WEAVER.
COTTON CHOPPER.
APPLICATION FILED MAY 7, 1912.

1,051,792.

Patented Jan. 28, 1913.
2 SHEETS—SHEET 1.

Inventor
John Robert Weaver

By Victor J. Evans
Attorney

Witnesses:

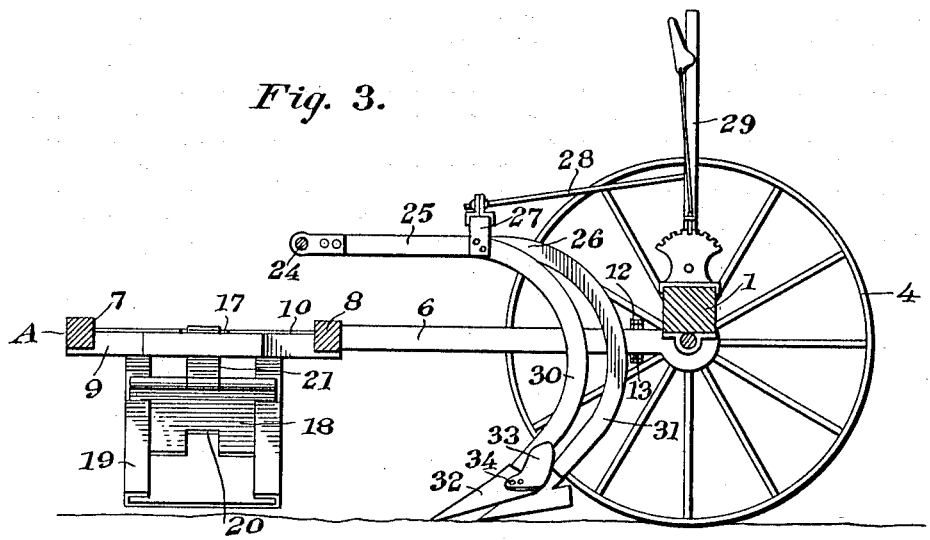
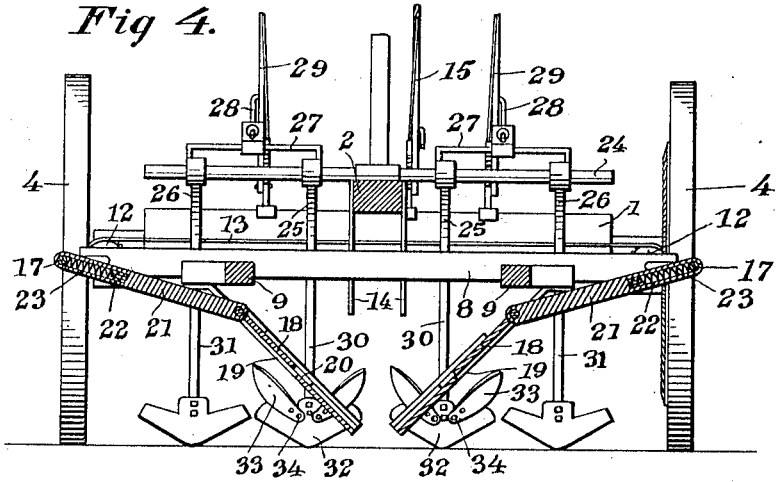
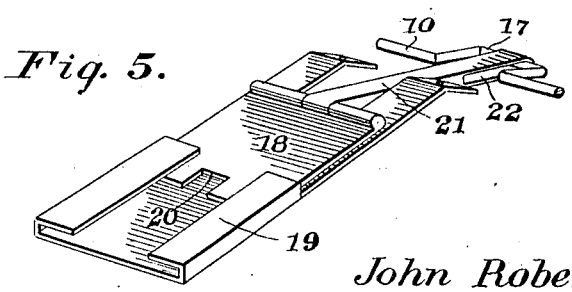

UNITED STATES PATENT OFFICE.

JOHN ROBERT WEAVER, OF GATESVILLE, TEXAS, ASSIGNOR OF ONE-HALF TO THOMAS J. FIKES, OF GATESVILLE, TEXAS.

COTTON-CHOPPER.

1,051,792.  Specification of Letters Patent.  Patented Jan. 28, 1913.

Application filed May 7, 1912. Serial No. 695,768.

*To all whom it may concern:*

Be it known that I, JOHN ROBERT WEAVER, a citizen of the United States, residing at Gatesville, in the county of Coryell and State of Texas, have invented new and useful Improvements in Cotton-Choppers, of which the following is a specification.

This invention relates to cotton choppers, and it has among its objects to produce a machine including coacting hoes, one on each side of the row of plants, whereby the superfluous plants will be chopped out in an even and regular manner without danger of uprooting the plants that are to be left standing for subsequent cultivation.

A further object of the invention is to so construct the machine that the chopping elements may be conveniently adjusted for the purpose of engaging the plants in the most efficient and satisfactory manner.

A further object of the invention is to simplify and improve a machine of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
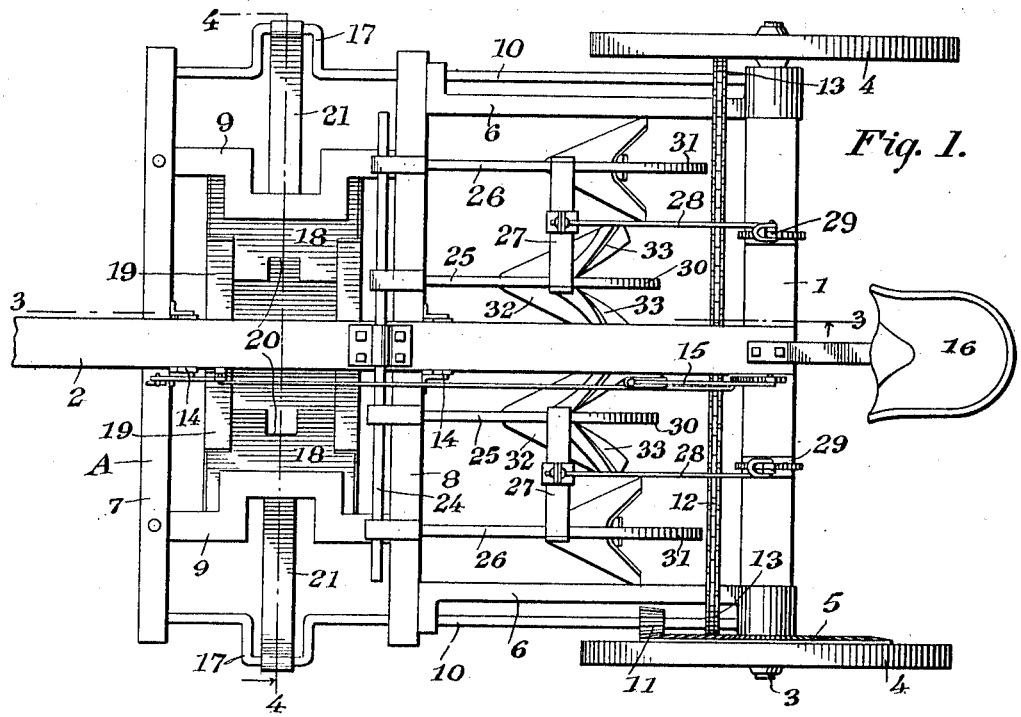
Figure 2:
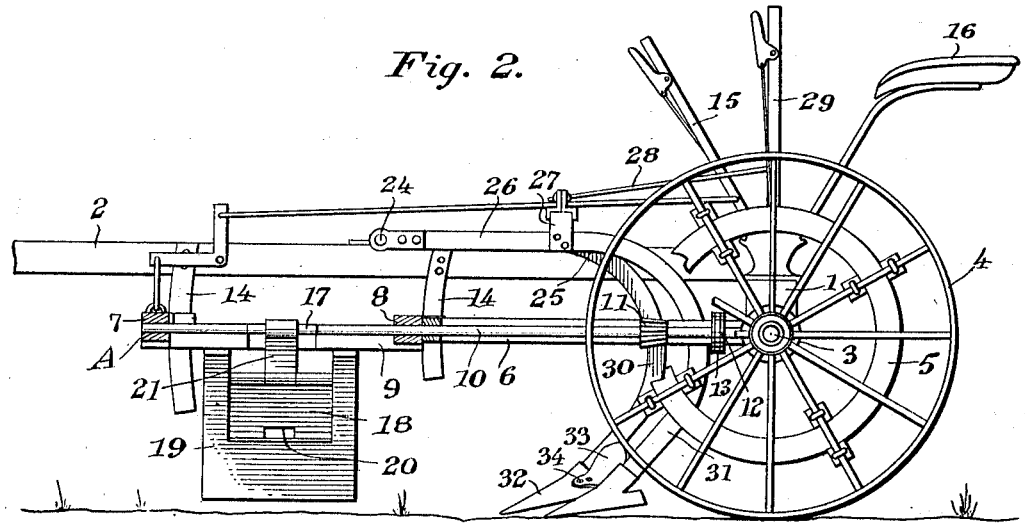

In the drawings,—Figure 1 is a top plan view of a machine constructed in accordance with the invention. Fig. 2 is a side elevation, partly in section. Fig. 3 is a longitudinal sectional view taken on the line 3—3 in Fig. 1. Fig. 4 is a transverse sectional view taken on the line 4—4 in Fig. 1. Fig. 5 is a perspective detail view of one of the chopping elements.

Corresponding parts in the several figures are denoted by like characters of reference.

The axle 1 supports the rear end of the tongue 2 which, together with the axle, constitutes the main frame structure of the machine. The axle is provided with spindles 3 whereon are journaled the transporting wheels 4, one of which carries a bevel gear 5.

Pivoted on the spindles 3 adjacent to the inner ends of the hubs of the transporting wheels are arms or brackets 6, the front ends of which support a frame A which is made up of front and rear members 7 and 8 connected together by cross pieces 9. Each of the arms or brackets 6 is provided with bearings for a shaft 10, the axis of which is radial to the axis of the wheel spindle, said shafts 10 being extended through the rear and front members of the frame A where they have additional bearings. One of the shafts 10 has a bevel pinion 11 meshing with the bevel gear 5 on the adjacent transporting wheel. Means is also provided for transmitting motion from the driven shaft 10 having the bevel pinion 11 to the shaft 10 at the opposite side of the machine, and as this motion must positively be at the same speed and in the opposite direction, the transmission means may consist of a crossed chain 12 running over sprockets 13 on the respective shafts, although any other well known means for transmitting the motion may be employed.

The frame A extends beneath the tongue 2, and the latter is provided with guiding means, such as arcuate arms 14 slidably engaged by the front and rear members of the frame A for the purpose of steadying the movement of said frame when raised or lowered. The vertical adjustment of said frame is effected by means of a hand lever 15 mounted on the axle 1 in convenient proximity to the operator whose seat 16 is likewise supported on the axle.

The shafts 10 are provided intermediate the front and rear members 7 and 8 of the frame A with cranks 17 for the purpose of actuating the chopping hoes. Said hoes consist of flat blades 18 that are mounted for reciprocation on flanged guide members 19 which are secured on the underside of the frame members 9 from which they extend downwardly in the direction of each other to present inclined planes on which the cutting blades 18 are mounted for reciprocation. The cutting blades 18 are provided at their lower edges with corresponding notches 20 of sufficient dimensions to leave one or more plants uncut to form a stand. Each of the blades 18 is connected with the crank 17 of one of the shafts 10 by means of a pitman 21 having a slot 22 engaging the crank, said slot serving also to accommodate a spring 23 which will be compressed by the action of a crank if the hoe blade should encounter an obstruction, such as a stone or a stump, thereby avoiding injury to the hoe blade without interrupting the operation of the machine.

Supported on top of the tongue 2 is a rod or shaft 24 on which the front ends of plow beams 25, 26 are pivotally mounted, said plow beams being connected in pairs by cross bars 27 that are connected by links 28 with adjusting levers 29. The standards 30 of the inner plow beams 25 being those which are nearest the row of plants to be operated upon are placed in advance of the standards 31 of the outer plow beams 26. The standards are equipped with mold boards 32 having adjustable wings 33 mounted detachably by means of bolts or fastening members 34, thus enabling the amount of dirt thrown toward the row of plants to be accurately controlled.

In the operation of this invention, it is evident that the frame carrying the chopping elements may be raised or lowered to throw it out of operation or to enable the row of plants to be engaged at the desired depth. As the machine progresses the hoe blades are reciprocated on their respective supporting members, and the edges of the hoe blades coming together will cut or chop out the superfluous plants, leaving a stand the dimensions of which will be determined by the dimensions of the notches or recesses 20 in the respective blades. The plows following behind the chopping elements will throw the desired amount of dirt in the direction of the plants which will thus be left in a condition to encourage and stimulate the growth thereof.

Having thus described the invention, what is claimed as new, is:—

1. In a cotton chopper, an axle having spindles, a tongue extending from the axle, transporting wheels on the spindles, arms pivoted on the spindles adjacent to the inner sides of the transporting wheels, a frame carried by said arms, said frame having front and rear members, shafts journaled upon the arms in radial relation to the wheel spindles and extending through the front and rear members of the frame, means for driving the shafts in opposite direction by power derived from one of the transporting wheels, means for effecting vertical adjustment of the frame, and cotton chopping elements supported on the frame and deriving motion from the shafts.

2. In a cotton chopper, an axle and a tongue connected therewith, rotary supporting means for the axle, a frame supported below the tongue for vertical adjustment, said frame having front and rear members, shafts extending through said front and rear members and having cranks between said members, means for rotating the shafts in opposite directions, flanged plates connected with the frame and extending downwardly in the direction of each other, hoes guided for reciprocation on said plates, the meeting edges of said hoes being provided with corresponding recesses, and pitmen connecting the hoes with the cranks on the shafts.

3. In a cotton chopper, an axle having supporting wheels and a forwardly extending tongue connected therewith, arcuate guide members connected with the tongue, a frame slidably engaging the arcuate guide members, said frame being supported for vertical adjustment, flanged guide plates supported by the frame, said plates being inclined downwardly in the direction of each other, coöperating hoes mounted on the plates and provided with notches at their meeting edges, crank shafts supported by the frame, said shafts being driven in opposite directions by power derived from the supporting wheels, and pitmen connecting the cranks of said shafts with the hoe blades, said pitmen having slots engaging the cranks and crank engaging springs supported in said slots.

4. In a cotton chopper, a vertically adjustable frame, flanged guide plates carried thereby, said plates being inclined in the direction of each other, hoes resiliently supported for reciprocation on said plates, said hoes having sharp meeting edges provided with corresponding notches, and means for actuating said hoes in the direction of each other.

In testimony whereof I affix my signature in presence of two witnesses.

JOHN ROBERT WEAVER.

Witnesses:
 DAN E. GRAVES,
 A. B. BENNETT.

---

Copies of this patent may be obtained for five cents each, by addressing the "Commissioner of Patents, Washington, D. C."